United States Patent [19]
Johansson

[11] Patent Number: 5,473,650
[45] Date of Patent: Dec. 5, 1995

[54] LOWER TIE PLATE DEBRIS CATCHER FOR A NUCLEAR REACTOR

[75] Inventor: Eric B. Johansson, Wrightsville Beach, N.C.

[73] Assignee: General Electric Company, Schenectady, N.Y.

[21] Appl. No.: 228,521

[22] Filed: Apr. 15, 1994

[51] Int. Cl.[6] .................................................. G21C 19/42
[52] U.S. Cl. .......................... 376/313; 376/352; 376/310; 376/443; 376/442
[58] Field of Search .................................. 376/352, 310, 376/443, 442, 313; 210/208, 210; 976/DIG. 264, DIG. 265

[56] References Cited

U.S. PATENT DOCUMENTS

| | | | |
|---|---|---|---|
| 1,240,081 | 9/1917 | Moss | 210/521 |
| 1,504,233 | 8/1924 | Graham | 210/446 |
| 1,992,472 | 2/1935 | Craig | 210/165 |
| 3,414,474 | 12/1968 | Swanson | 376/425 |
| 3,528,885 | 9/1970 | Kumpf | 376/440 |
| 3,725,199 | 4/1973 | Notari et al. | 376/352 |
| 3,801,453 | 4/1974 | Jones | 376/440 |
| 3,840,051 | 10/1974 | Akashi et al. | 138/37 |
| 3,878,870 | 4/1975 | Atherton et al. | 138/42 |
| 3,879,259 | 4/1975 | Persson et al. | 376/224 |
| 3,945,883 | 3/1976 | Hind et al. | 376/280 |
| 3,971,698 | 7/1976 | Wolff et al. | 376/352 |
| 4,032,398 | 6/1977 | Cross et al. | 376/443 |
| 4,036,690 | 7/1977 | Betts et al. | 376/175 |
| 4,053,358 | 10/1977 | Pennell | 376/286 |
| 4,053,359 | 10/1977 | Pennell et al. | 376/365 |
| 4,076,586 | 2/1978 | Bideau et al. | 376/364 |
| 4,096,032 | 6/1978 | Mayers et al. | 376/313 |
| 4,116,764 | 9/1978 | Jones | 376/280 |

(List continued on next page.)

FOREIGN PATENT DOCUMENTS

| | | |
|---|---|---|
| 90104066.5 | 12/1990 | China . |
| 0196611 | 10/1986 | European Pat. Off. . |
| 0289829 | 11/1988 | European Pat. Off. . |
| 0311037 | 4/1989 | European Pat. Off. . |
| 0455011A1 | of 1991 | European Pat. Off. . |
| 0432739A1 | 6/1991 | European Pat. Off. . |
| 0432738A1 | 6/1991 | European Pat. Off. . |
| 0435744A1 | 7/1991 | European Pat. Off. . |
| 0466553A1 | 1/1992 | European Pat. Off. . |
| 4006264A1 | 8/1991 | Germany . |
| 54-19080 | 2/1979 | Japan . |
| 54-102493 | 8/1979 | Japan . |
| 54-141989 | 11/1979 | Japan . |
| 57-102215 | 6/1982 | Japan . |
| 60-162985 | 8/1985 | Japan . |
| 62-96891 | 5/1987 | Japan . |
| 63-61183 | 3/1988 | Japan . |
| 63-157093 | 6/1988 | Japan . |
| 64-39593 | 2/1989 | Japan . |
| 64-83189 | 3/1989 | Japan . |
| 3-111795 | 5/1991 | Japan . |
| 3-274491 | 12/1991 | Japan . |
| 1214998 | of 1970 | United Kingdom . |

*Primary Examiner*—Donald P. Walsh
*Assistant Examiner*—Meena Chelliah
*Attorney, Agent, or Firm*—Nixon & Vanderhye

[57] ABSTRACT

A unitary one-piece lower tie plate grid has a lower portion and an upper portion for supporting the fuel rods. The lower tie plate grid includes cylindrical boss portions extending upwardly from the lower grid portion and arranged in square matrices for receiving the lower end plugs of the fuel rods. Web portions extending upwardly from the lower tie plate portion interconnect the boss portions along the sides of the matrices. The lower grid portion includes a plurality of openings which open into the flow spaces defined by the convex portions of the bosses and the webs within each square matrix of the upper portion of the tie plate. Coolant flows through the openings into the flow spaces for further flow upwardly about the fuel rods. The openings are radiussed adjacent their lower ends and have tapered divergent walls opening into the flow spaces. In another form, the openings have a step intermediate the upper and lower surfaces of the lower grid portion to define a minimum cross-sectional flow area.

20 Claims, 4 Drawing Sheets

U.S. PATENT DOCUMENTS

| | | | |
|---|---|---|---|
| 4,198,272 | 4/1980 | Salmon | 376/175 |
| 4,412,969 | 11/1983 | Tilbrook et al. | 376/280 |
| 4,420,457 | 12/1983 | Le Pargneux | 376/446 |
| 4,427,624 | 1/1984 | Marlatt et al. | 376/352 |
| 4,446,099 | 5/1984 | Schwind et al. | 376/277 |
| 4,505,877 | 3/1985 | Rion | 376/352 |
| 4,610,838 | 9/1986 | Gasparro et al. | 376/248 |
| 4,614,636 | 9/1986 | Walters | 376/451 |
| 4,615,862 | 10/1986 | Huckstein | 376/362 |
| 4,634,525 | 1/1987 | Yant | 210/171 |
| 4,652,425 | 3/1987 | Ferrari et al. | 376/352 |
| 4,655,995 | 4/1987 | Freeman et al. | 376/267 |
| 4,664,880 | 5/1987 | Bryan | 376/352 |
| 4,678,627 | 7/1987 | Rylatt | 376/313 |
| 4,684,495 | 8/1987 | Wilson et al. | 376/352 |
| 4,684,496 | 8/1987 | Wilson et al. | 376/352 |
| 4,716,012 | 12/1987 | Gasparro et al. | 376/352 |
| 4,772,447 | 9/1988 | Manson et al. | 376/441 |
| 4,781,884 | 11/1988 | Anthony | 376/352 |
| 4,826,653 | 5/1989 | Nylund et al. | 376/444 |
| 4,828,791 | 5/1989 | DeMario | 376/352 |
| 4,832,905 | 5/1989 | Bryan et al. | 376/352 |
| 4,849,161 | 7/1989 | Brown et al. | 376/439 |
| 4,900,507 | 2/1990 | Shallenberger et al. | 376/352 |
| 4,919,883 | 4/1990 | Bryan et al. | 376/352 |
| 4,933,138 | 6/1990 | Movesca et al. | 376/442 |
| 4,980,121 | 12/1990 | Roberts et al. | 376/439 |
| 5,009,839 | 4/1991 | King | 376/352 |
| 5,024,806 | 6/1991 | Cioffi et al. | 376/352 |
| 5,024,807 | 6/1991 | Hatfield et al. | 376/352 |
| 5,030,412 | 7/1991 | Yates et al. | 376/352 |
| 5,037,605 | 8/1991 | Riordan, III | 376/352 |
| 5,066,453 | 11/1991 | Heppenstall et al. | 376/352 |
| 5,071,617 | 12/1991 | Bryan et al. | 376/352 |
| 5,094,802 | 3/1992 | Riordan, III | 376/352 |
| 5,100,611 | 3/1992 | Nylund | 376/352 |
| 5,106,575 | 4/1992 | Nakamura et al. | 376/439 |
| 5,128,096 | 7/1992 | Grattier | 376/313 |
| 5,135,710 | 8/1992 | Grattier et al. | 376/313 |
| 5,160,697 | 11/1992 | Verdier et al. | 376/352 |
| 5,180,545 | 1/1993 | Grattier | 376/313 |
| 5,219,517 | 6/1993 | Nylund | 376/352 |
| 5,230,861 | 7/1993 | Nylund | 376/439 |
| 5,282,231 | 1/1994 | Adams et al. | 376/352 |
| 5,345,483 | 9/1994 | Johansson | 376/313 |

Fig. 2
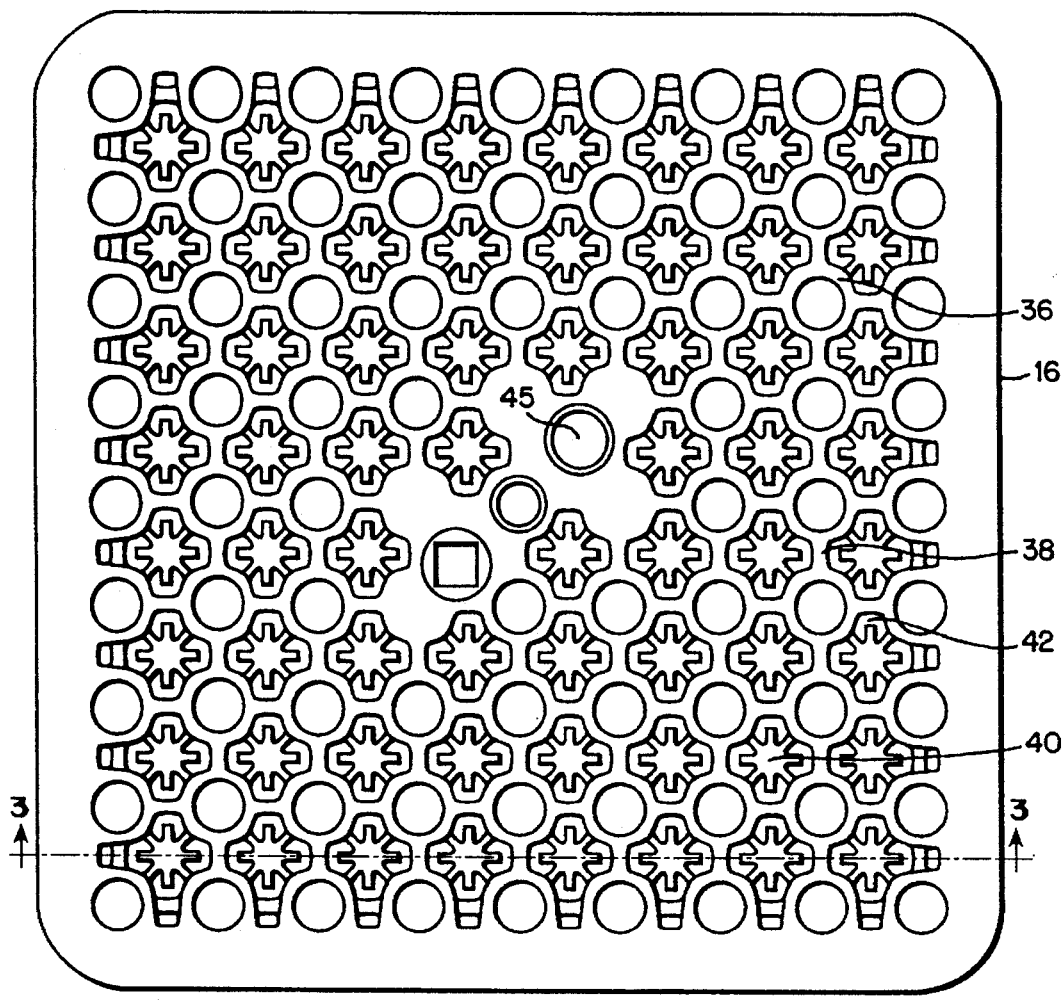
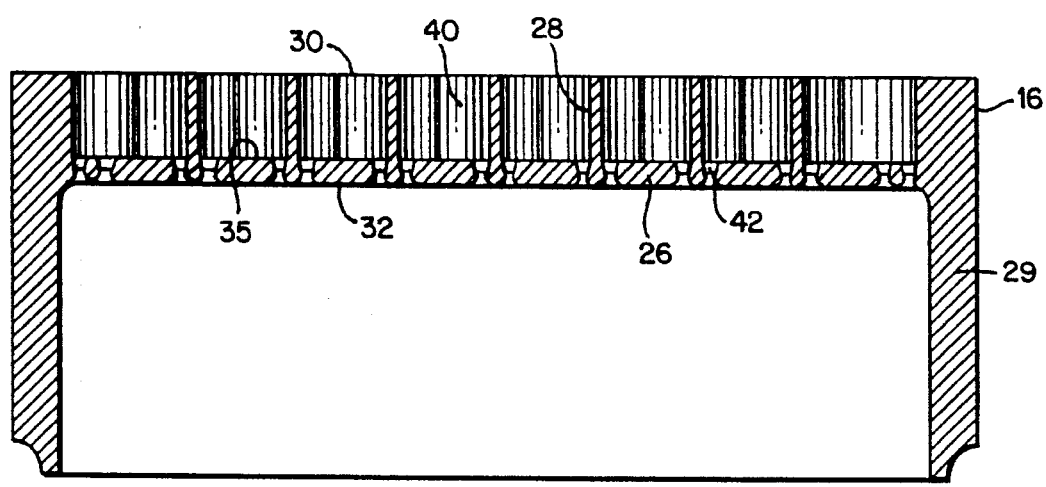
Fig. 3

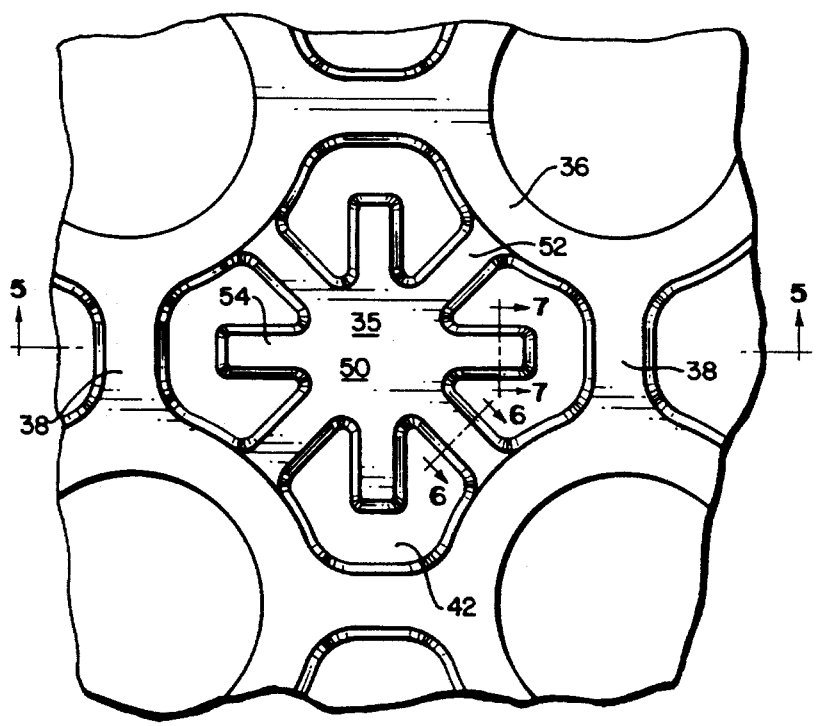
Fig. 4
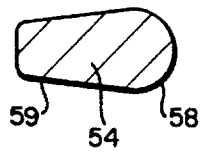
Fig. 7
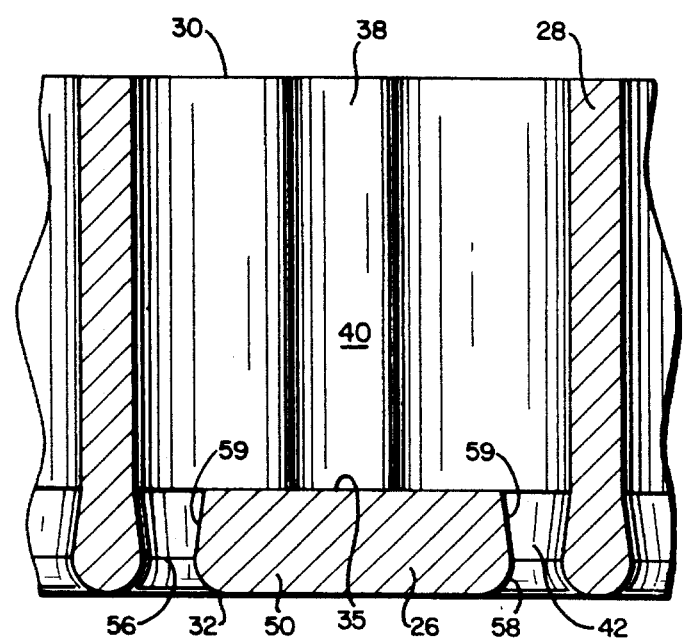
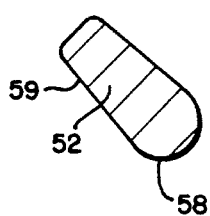
Fig. 6
Fig. 5

LOWER TIE PLATE DEBRIS CATCHER FOR A NUCLEAR REACTOR

TECHNICAL FIELD

The present invention relates to a lower tie plate grid for a nuclear reactor fuel bundle and particularly relates to a unitary one-piece lower tie plate grid forming part of a lower tie plate assembly, the grid having a lower portion with a plurality of small openings for separating debris from the flow of water coolant through the tie plate, and an upper portion which, in conjunction with the lower portion, support the fuel bundle. The grid is constructed to afford a minimum pressure loss for the water coolant flow through the tie plate grid into the region downstream of the tie plate assembly.

BACKGROUND

Boiling water nuclear reactors have been in operation for many years. Commencing with their initial construction and throughout their service lives, these reactors may accumulate debris in their closed circulation moderator systems. This debris can become an operating hazard if the debris is allowed to enter into the fuel bundle core region containing the heat generating fuel rods. In order to understand this problem, a summary of reactor construction as it relates to the accumulation of debris in the core needs first to be given. Thereafter, fuel bundle construction will be set forth. Emphasis will be given to the need to preserve substantially unchanged the regions of pressure drop within the fuel bundles. Thereafter, the effects caused by debris entering into the fuel rod region of the fuel bundles will be summarized.

In boiling water nuclear reactor construction, the reactor is provided with a large, central core. Liquid water coolant/moderator flow enters the core from the bottom and exits the core as a water steam mixture from the top. The core includes many side-by-side fuel bundles, each containing a plurality of fuel rods. Water is introduced into each fuel bundle through a fuel bundle support casting from a high pressure plenum situated below the core. Water passes in a distributed flow through the individual fuel bundles and about the fuel rods, is heated to generate steam, and exits the upper portion of the core as a two-phase water steam mixture from which the steam is extracted for the generation of energy.

The core support castings and fuel bundles are a source of pressure loss in the circulation of water through the core. By properly controlling such pressure losses substantially even distribution of flow across the individual fuel bundles of the reactor core is achieved. When it is remembered that there are as many as 750 individual fuel bundles in a reactor core, it can be appreciated that assurance of the uniformity of flow distribution is important. To interfere with the pressure drop within the fuel bundles could affect the overall distribution of coolant/moderator within the fuel bundles of the reactor core.

The fuel bundles for a boiling water nuclear reactor include a fuel rod supporting lower tie plate assembly. Typically, this is a one-piece cast structure including an upper grid, a lower inlet nozzle and a structure providing a transition region from the inlet to the grid. The inlet nozzle provides for coolant entry to an enlarged flow volume within the flow transition region of the lower tie plate assembly. At the upper end of the flow volume, there is located a tie plate grid defining with the nozzle a flow volume. The tie plate grid has two purposes. First, it provides the mechanical support connection for the weight of the individual fuel rods to be transmitted through the entire lower tie plate assembly to the fuel support casting. Secondly, the tie plate grid provides a path for liquid water moderator to flow into the fuel bundle for passage between the side-by-side supported fuel rods.

Above the lower tie plate grid, each fuel bundle includes a matrix of upstanding fuel rods—sealed tubes each containing fissionable material which when undergoing nuclear reaction transfers energy to the flowing water to produce the power generating steam. The matrix of upstanding fuel rods includes at its upper end an upper tie plate assembly. This upper tie plate assembly holds at least some of the fuel rods in vertical side-by-side alignment. Some of the fuel rods are attached to both the upper and lower tie plate assemblies. Usually, water rods are also included between the upper and lower tie plate assemblies for improvement of the water moderator to fuel ratio, particularly in the upper region of the fuel bundle.

Fuel bundles also include a number of fuel rod spacers at varying elevations along the length of the fuel bundle. These spacers are required because the fuel rods are long (about 160 inches) and slender (about 0.4 to 0.5 inches in diameter), and would come into abrading contact under the dynamics of fluid flow and nuclear power generation within the fuel bundles. The spacers provide appropriate lateral restraints for each fuel rod at their respective elevations and thus prevent abrading contact between the fuel rods and maintain the fuel rods at uniform spacing relative to one another along the length of the fuel bundle for optimum performance. It will be appreciated that these spacers are sites where debris can be trapped and damage the fuel rods.

Each fuel bundle is surrounded by a channel. This channel causes water flowing between the upper and lower tie plate assemblies to be restricted to only one bundle in an isolated flow path between the tie plate assemblies. The channel also serves to separate the steam generating flow path through the fuel bundles from the surrounding core bypass region, this region being utilized for the penetration of the control rods. The water in the bypass region also provides neutron moderation.

In the operation of a boiling water nuclear reactor, maintenance of the originally designed flow distribution is very important. Specifically, from the lower (high pressure) plenum inlet to the core to the outlet from the core of the steam and water mixture through the upper tie plate assemblies of the fuel bundles, about 20 pounds per square inch (psi) of the pressure drop is encountered at typical flow operating conditions. About 7 to 8 psi of this pressure drop occurs through the fuel support casting. This pressure drop is mainly to assure the uniform distribution of coolant/moderator flow through the many fuel bundles making up the core of the reactor and is related to the prevention of operating instabilities within the reactor at certain power rates. At the lower tie plate assembly of each fuel bundle, from the inlet nozzle into the flow volume and through the tie plate grid, about 1 to 1½ psi pressure drop occurs which contributes to establishing flow distribution between the individual fuel rods of each fuel bundle. Finally, through the fuel bundle itself—from the exit of the lower tie plate assembly to the exit at the supper tie plate assembly—about 11 psi of pressure drop usually occurs. When new fuel bundles are introduced into a reactor core, these pressure drops must be preserved. Otherwise, the coolant/moderator flow distribution could be compromised.

With respect to the tie plate grid of the lower tie plate assembly, a matrix of cylindrical bosses and webs generally form the grid. The bosses are sized to receive the fuel rod end plugs. The spacing and thickness of the bosses and webs are primary factors in controlling pressure drop resulting from water flow through the grid.

In early grid constructions, since the fuel rods had greater cross-sectional diameters, the bosses were large. In more recent grid constructions, since the fuel rods have smaller cross-sectional diameters, the bosses are smaller. Also, in early constructions, fewer fuel rods formed a fuel bundle than in recent constructions.

Even with all of these changes in grid and bundle construction, however, it is necessary to avoid significantly altering pressure drop. For is example, a core may be composed of older (8×8) bundles and newer (11×11) bundles, and the pressure drop through each bundle preferably is uniform. One challenge with new fuel bundle constructions, and particularly, lower tie plate grid constructions, is to accommodate more fuel rods and perform debris catching functions yet maintain a pressure drop equivalent to the pressure drop resulting from older bundle constructions.

Typically, debris within boiling water nuclear reactors can include extraneous materials left over from reactor construction, debris liberated from corrosion during the reactor lifetime, and during the numerous outages and repairs, further debris accumulates. Because nuclear reactors constitute closed circulation systems, it will be appreciated that debris will essentially accumulate with increasing age and use of the reactor. A particularly vexing and usual place for the accumulation of debris is in the fuel bundles between the fuel rods, particularly in the vicinity of the fuel rod spacers. It will be recalled that each fuel rod is surrounded by a spacer at the particular elevation of the spacer. Debris particles tend to lodge between the spacer structure and the fuel rods and often dynamically vibrate with the coolant/ moderator flow in abrading contact to the sealed cladding of the fuel rods.

SUMMARY OF THE INVENTION

The present invention provides a lower tie plate assembly including a debris catcher forming part of a grid. The grid has lower and upper portions, the lower portion serving to catch debris above a predetermined size, while simultaneously providing minimal pressure drop of water coolant through the grid. The grid also supports the fuel rods in a manner enabling a smooth, substantially uniform expansion of the flow into the fuel bundle. To accomplish the latter, a plurality of laterally spaced, generally cylindrical bosses, defining through openings, extend between upper and lower surfaces of the lower tie plate grid and receive lower ends of the fuel rods. Webs also extend between those surfaces and interconnect the bosses. The bosses and webs include respective portions thereof which extend upwardly from the lower portion of the grid and lie coextensively with the upper portion of the grid to define in the upper grid portion a plurality of flow spaces. The bosses are arranged on vertical centerlines arranged at the corners of square matrices, with the webs extending linearly between the bosses along the sides of the square matrices. Convex portions of the cylindrical bosses extend between the right angularly related webs of each matrix. Thus, the webs and the convex portions of the bosses of the upper portion of the lower tie plate grid define the flow spaces.

This lower grid portion has a plurality of openings extending therethrough and which open into the flow spaces. These lower grid portion openings separate debris above a certain size from the water flowing through those openings into the flow spaces between the boss and web portions in the upper grid portion. In a preferred embodiment of the present invention, a plurality of openings extend through the lower grid portion and open into each of the flow spaces. In order to minimize the pressure loss and maximize the debris catching function, the openings are specifically oriented, shaped and dimensioned. Each opening is in part defined by lower boss and web portions in the lower grid portion. Particularly, each opening is defined by a pair of convex lower boss portions and an intervening lower web portion between the pair of lower boss portions in the lower grid portion. Additionally, each opening is in part defined by a central region in the lower grid portion which lies in vertical registration with the flow space of the upper grid portion. The central region has laterally projecting ribs which connect with the lower convex boss portions of the lower grid portion. The central region also includes ribs which project laterally therefrom terminating in free ends short of the web portions in the lower grid portion. Thus, each opening is defined in the lower grid portion by a pair of convex portions of the bosses, an intervening web portion, the margins of a pair of connecting ribs of the central region and an intermediate rib which projects from the central region toward a web portion. The upper surface of the central portion including the ribs defines the upper surface of the lower grid portion and the lower surface for the flow spaces between the upper boss and web portions.

With the foregoing described arrangement of the openings, it will be seen that each opening is of a generally U-shaped configuration in plan with the legs of the U-shaped opening extending from a web portion toward the center of the square matrix defined by the bosses. Accordingly, there is provided four such openings of this configuration surrounding a central region in each area of the lower grid portion within the square matrices defined by the bosses.

In a preferred embodiment, each opening through the lower grid portion is further defined by a throat area intermediate the underside of the lower grid portion and the upper surface of the lower grid portion. Between the undersurface of the lower grid portion and the throat area, each opening is further defined by a radius along the lower surface of the tie plate grid. In a preferred form, the wall portions of the boss and web portions and the central region in the lower grid portion diverge from one another such that the coolant flow passage through each opening increases in cross-sectional area in an upward direction toward the flow spaces. In another embodiment thereof, the lower grid portion is defined by a step intermediate the upper and lower surfaces of the central region. The lower surface of the tie plate grid has a radius about the openings and the wall portions extend upwardly from the step to define a coolant flow passage of constant cross-sectional area opening into the flow spaces. In each embodiment, the throat area defines the smallest cross-sectional area of the openings and serves to catch debris larger than this minimum area and prevents such debris from passing through the grid. Consequently, the flow pattern for each opening obtains a substantial uniform velocity over its cross-section. This arrangement facilitates the debris catching function with minimum pressure drop.

In preferred embodiment according to the present invention, there is provided in a nuclear fuel assembly, a unitary one-piece lower tie plate grid comprising a lower grid portion and an upper grid portion and means for supporting fuel rods above the lower tie plate grid including the upper and lower grid portions. The supporting means comprise a plurality of laterally spaced bosses having portions extending upwardly from the lower grid portion, the bosses being sized for receiving lower ends of the fuel rods, the supporting means further including web portions extending upwardly from the lower grid portion and interconnecting the boss portions to define with the boss portions a plurality of flow spaces in the upper grid portion extending from the lower grid portion and opening through an upper surface of the lower tie plate grid, the lower grid portion of the lower tie plate grid including a plurality of openings extending therethrough and opening into the flow spaces for separating debris from a coolant flowing through the lower grid portion into the flow spaces between the boss and the web portions. The openings are defined in part by central regions in the lower grid portion having laterally projecting ribs in the lower grid portion and connected with the lower grid portion.

In a further preferred embodiment according to the present invention, there is provided in a nuclear fuel assembly, a fuel rod support structure comprising a lower tie plate assembly including an inlet nozzle, a unitary one-piece lower tie plate grid and a transition structure defining a flow volume for receiving coolant entering the nozzle and flowing coolant to the lower tie plate grid, the unitary one-piece lower tie plate grid having a lower grid portion and an upper grid portion. The lower tie plate grid comprises a plurality of laterally spaced bosses having portions extending upwardly from the lower grid portion, the bosses being sized for receiving lower ends of the fuel rods, the lower tie plate grid further including web portions extending upwardly from the lower grid portion and interconnecting the boss portions to define with the boss portions a plurality of flow spaces in the upper grid portion extending from the lower grid portion and opening through an upper surface of the lower tie plate grid. The lower grid portion of the lower tie plate grid includes a plurality of openings extending therethrough and opening into the flow spaces for receiving the coolant from the flow volume and flowing the coolant through the lower grid portion into the flow spaces between the bosses and the web portions. The openings are defined in part by central regions in the lower grid portion having laterally projecting ribs in the lower grid portion, the ribs being connected with adjacent portions of the lower grid portion and the openings being defined in further part by ribs projecting laterally from the central regions and terminating in free ends short of adjacent portions of the lower grid portion.

In a still further preferred embodiment according to the present invention, there is provided a nuclear fuel bundle and support therefor comprising upper and lower tie plate assemblies, a nuclear fuel bundle between the upper and lower tie plate assemblies and including a plurality of fuel rods, the lower tie plate assembly including means for supporting the nuclear fuel bundles, the lower tie plate assembly further including a lower tie plate grid having a lower grid portion and an upper grid portion. The lower tie plate grid comprises a plurality of laterally spaced bosses having portions extending upwardly from the lower grid portion, the bosses being sized for receiving lower ends of the fuel rods, the supporting means further including web portions extending upwardly from the lower grid portion and interconnecting the boss portions to define with the boss portions a plurality of flow spaces in the upper grid portion extending from the lower grid portion and opening through an upper surface of the lower tie plate grid. The openings are defined in part by central regions in the lower grid portion having laterally projecting ribs in the lower grid portion and connected with the lower grid portion.

Accordingly, it is a primary object of the present invention to provide a novel and improved unitary one-piece lower tie plate grid for supporting a nuclear fuel bundle and having a lower portion for limiting the passage of debris in the moderator flow through the tie plate grid with minimal pressure drop.

BRIEF DESCRIPTION OF THE DRAWINGS

FIG. 2 is an enlarged top plan view of a lower tie plate grid constructed in accordance with the present invention;

FIG. 3 is a cross-sectional view of the lower tie plate grid taken generally about on line 3—3 in FIG. 2;

FIG. 4 is an enlarged fragmentary top plan view of the lower tie plate grid illustrating four bosses for supporting fuel rods, the flow space therebetween, and openings through the lower grid portion which serve a debris catching function;

FIG. 5 is a cross-sectional view thereof taken generally about on line 5—5 in FIG. 4;

FIGS. 6 and 7 are enlarged cross-sectional views taken generally about on line 6—6 and 7—7 in FIG. 4;

BEST MODE FOR CARRYING OUT THE INVENTION

Figure 1:
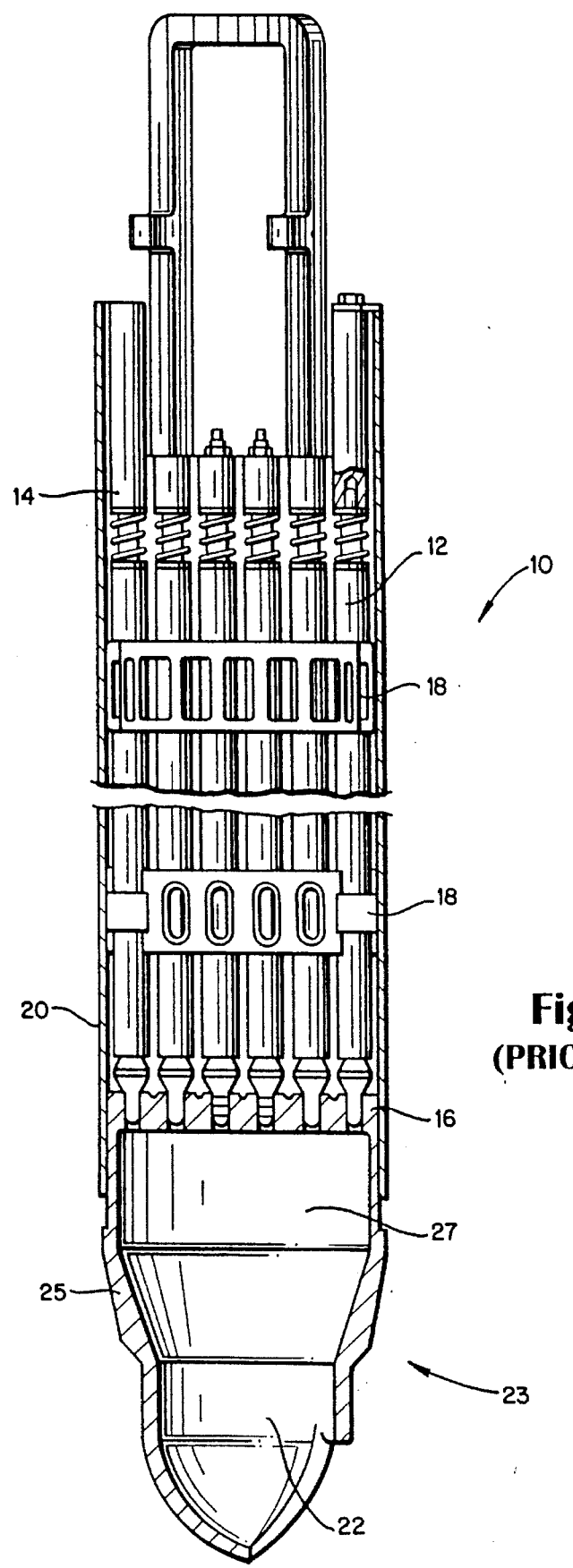
FIG. 1 is a vertical cross-sectional view of a conventional fuel assembly illustrating a fuel bundle supported on a lower tie plate assembly.
Figure 8:
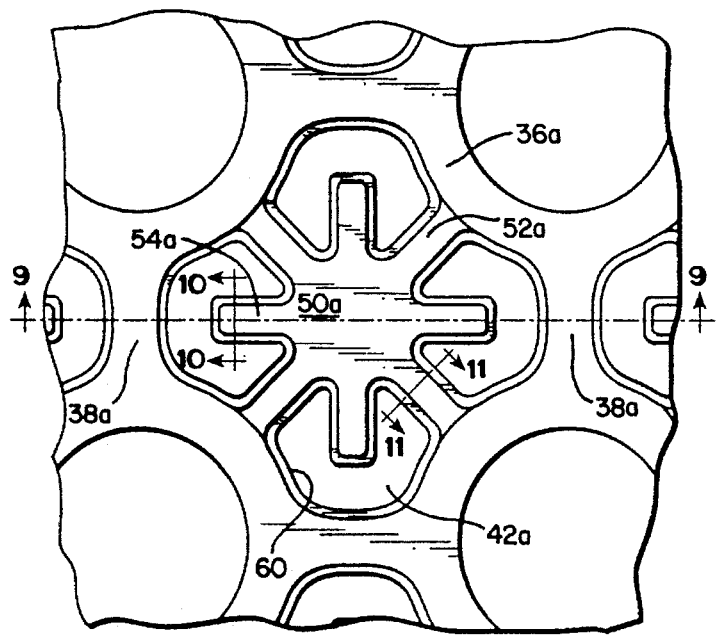
FIG. 8 is an enlarged fragmentary top plan view of a lower tie plate grid similar to FIG. 4, illustrating a further form of openings through the lower grid portion serving the debris catching function.
Figure 10:
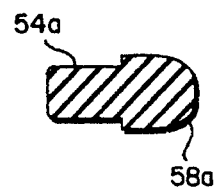
FIGS. 10 and 11 are enlarged cross-sectional views taken generally about on lines 10—10 and 11—11 in FIG. 8.
Figure 9:
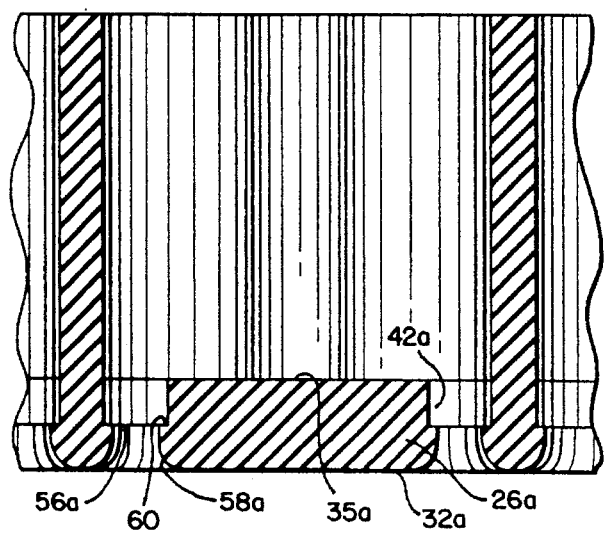
FIG. 9 is a cross-sectional view thereof taken generally about on line 9—9 in FIG. 8.
Figure 11:
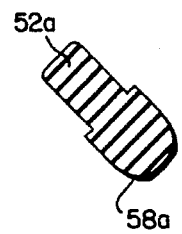

Referring now to the representative example of a fuel assembly, generally designated 10 in FIG. 1, there is illustrated a plurality of nuclear fuel rods 12 forming a nuclear fuel bundle. The rods 12 are connected at their upper ends to an upper tie plate 14 and are supported at their lower ends in a lower tie plate grid, generally designated 16, forming part of a tie plate assembly, generally designated 23. Spacers 18 are arranged at a plurality of vertically spaced locations to maintain lateral spacing of the fuel rods 12 relative to one another. The fuel bundle is disposed within a fuel bundle channel 20 whereby coolant water inlet through the bottom nozzle or inlet opening 22 of the tie plate assembly 23 flows upwardly therefrom through a transition structure 25 defining an enlarged flow volume 27 for flow through the lower tie plate grid 16 thereof and about the fuel rods whereby steam is generated. As indicated previously, it is important that debris in the flow of the coolant water be prevented from flowing into the area between the fuel rods. Accordingly, a lower tie plate assembly 23 including a unitary one-piece lower tie plate grid 16 serving the dual purpose of catching debris and supporting the fuel bundle according to the present invention is described and illustrated with respect to subsequent drawing figures.

Referring now to FIGS. 2 and 3, there is illustrated a unitary one-piece lower tie plate grid 16 according to the present invention forming a part of the lower tie plate assembly 23. Lower tie plate grid 16 may be integrally cast with the lower tie plate assembly 23 but is preferably formed separately and secured thereto as by welding its depending side walls 29 to assembly 23. Lower tie plate grid 16 has a lower grid portion 26 for separating debris from the flow of water through the tie plate with minimum pressure drop and an upper portion 28 which, together with the lower portion, support the fuel rods above the lower tie plate grid 16. The upper portion 28 affords flow spaces which assist to minimize the pressure drop across the lower tie plate grid and enable is the fluid to expand within the flow spaces uniformly and smoothly for subsequent flow about the fuel rods. Turning first to FIG. 2, there is illustrated a plurality of generally cylindrical bosses 36 which extend between the upper and lower surfaces 30 and 32 (FIG. 3), respectively, of tie plate grid 16 for receiving the cylindrical end plugs of the nuclear fuel rods and supporting the latter, the bosses 36 having portions projecting upwardly from the upper surface 35 of the lower grid portion 36. As best seen in FIG. 2, the cylindrical bosses have centerlines arranged at corners of substantially square matrices of such bosses 36. Interconnecting and forming the sides of the square matrices are webs 38 adjoining the adjacent cylindrical bosses 36 along radial lines of bosses 36 and extending between the upper and lower surfaces 30, 32 of the lower tie plate grid 16. Consequently, it will be seen that above the lower grid portion 26, the webs 38 have portions formed along the sides of each square matrix and, together with convex outer portions of the cylindrical bosses 36, define side walls of upper flow spaces 40. As described below, the lower portion 26 has a plurality of openings for flowing coolant through the lower portion and into each of the flow spaces where the flow expands smoothly at reduced velocity for flow upwardly about the fuel rods supported by the lower tie plate assembly 23.

The debris catching function of the tie plate is performed by the lower grid portion 26. To accomplish this debris catching function, lower portion 26 includes a plurality of openings 42 which open through the lower surface 32 of grid 16 and through the upper surface 35 of the lower portion 26 into the flow spaces 40. From a review of FIGS. 2 and 3, it will be seen that the openings through the cylindrical bosses 36 extend between the upper and lower surfaces 30, 32, respectively, of grid 16. Openings 42, however, extend through only the lower portion 26 from lower surface 32 to surface 35 and open through surface 35 thereof into the flow spaces 40. The openings 42 are configured and dimensioned to maximize the debris catching function, while simultaneously minimizing the pressure drop across the lower grid portion resultant from the need to filter the debris from the coolant water.

As illustrated in FIG. 2, the central portion of the tie plate has openings 45 for water rods, not shown, which alter the arrangement of the openings 42 in the adjacent flow spaces defined by adjacent bosses 36 and webs 38. It will be appreciated from a review of FIG. 2 that the bosses 36 and flow spaces in part defined thereby are arranged in a generally square array on the lower tie plate grid. The flow spaces 40, however, along margins of the grid are enlarged toward the edge at the grid and have an additional opening 42 through the lower grid portion for flowing coolant into the enlarged flow spaces 40 along the margin of the grid as described hereafter.

Referring now to FIGS. 4 and 5, the lower grid portion 26 includes a central region 50 in vertical registration with each of the flow spaces 40. Each central region 50 and lower portions of the lower bosses and webs in conjunction with the openings 42 defined thereby constitute the lower grid portion. As illustrated, central region 50 has a plurality of diagonally projecting ribs 52 which connect with the convex sides of the lower boss portions in the lower grid portion 26. These ribs 52 lie on diagonal lines extending between diagonally oriented centerlines of the bosses in each of the square matrices. The central region 50 also includes laterally projecting ribs 54. Ribs 54 extend between ribs 52 in a symmetrical arrangement in plan and terminate short of the opposed lower web portions 38. As a consequence of this arrangement, it will be seen that the openings 42 are defined in part by convex portions of adjacent bosses, an intervening web portion between the adjacent bosses, marginal edges of a pair of ribs 52 and the marginal edges of a rib 54. It will also be seen from a review of FIG. 5 that the central region has an upper surface including the upper surfaces of ribs 52 and 54 which define the uppermost surface 35 of the lower grid portion and a lowermost surface of the flow space 40 above the central region and in vertical registration therewith.

As illustrated in FIG. 4, each of the openings 42 is thus generally U-shaped in plan. The legs of the generally U-shaped opening extend toward the center of the square matrix defined by the bosses 36 or toward the center of the central region 50.

As illustrated in FIGS. 5–7, the openings 42 through the lower grid portion are shaped to provide a coolant flow area of minimum cross-section at a throat 56 intermediate the upper and lower surfaces 35 and 32, respectively, of the lower grid portion 26. Thus, the throat defines the minimum cross-sectional area of the general U-shaped opening 42. Below the throat 56 and at the entrance to each of the openings 42, there is provided a radius 58 along the margin of each U-shaped opening. Above the throat 56 and each opening, the wall portions 59 of the boss and web portions and the central region which define each opening 42 diverge away from one another to open through an enlarged cross-sectional area into the flow space 40 above the central region. Thus, the wall portions 59 taper from the throat 56 upwardly to the uppermost surface 35 of the lower grid portion in a direction tending to enlarge the cross-sectional flow area through the opening in an upward direction.

The lower tie plate grid illustrated in FIGS. 8–11 constitutes a second embodiment of the present invention wherein like reference numerals are applied to like parts as in the previous embodiment, followed by the letter suffix "a". In this embodiment, the arrangement of the bosses, webs and central regions is the same as in the prior embodiment. The essential difference between the two embodiments is the configuration of the openings 42a through the lower grid portion. In this form, the openings 42a are provided with a step 60 intermediate the upper and lower surfaces 35a and 32a, respectively, of the lower grid portion 26a. The step 60 preferably lies medially between those surfaces and defines a slightly enlarged flow area above the step in the direction of the coolant flow. The outer margin of the step 60 thus defines the minimal area of the generally U-shaped opening 42a, i.e., the throat area 56a. Below the step 60 and at the entrance to each of the openings 42a, there is provided a radius 58a along the margin of each U-shaped opening 42a.

Unless otherwise noted, the following characteristics apply to both forms of the invention as described and illustrated herein. In a particular preferred form of the present invention, there is provided a generally square lower tie plate 5.41 inches on a side having a total cross-sectional area of 29.27 inches. The total flow area through the openings 42 in the lower grid portion is 4.8 sq. inches and hence the ratio of the flow area through openings 42 to the area of the lower grid portion 26 of the tie plate grid is about 0.16 and preferably between 0.15 and 0.17. Additionally, the thickness of the lower portion 26 is preferably less than about 25% of the overall thickness of the tie plate. In the preferred embodiment illustrated herein, the thickness of the tie plate grid 16 between upper and lower surfaces 30 and 32 is about 0.590 inches and the thickness of the lower grid portion 26 is 0.120 inch. Accordingly, in a preferred embodiment hereof the ratio of the overall thickness of the tie plate grid to the thickness of the lower grid portion thereof is within a range of 4–6:1 and preferably about 4.9.

The centerlines of the bosses lie on centers preferably spaced 0.566 inches from one another, the inside radius of the bosses from its center being 0.145 while the outside radius is 0.210. The radius from the centerline of boss to the outer edge of the nearest step is 0.22 inches. The radii at the lower surfaces 32 defining the openings 42 in the first embodiment are 0.040 inches and, in the second embodiment, 0.030 inches, forming a completely rounded edge facing the coolant flow. In the first embodiment, the maximum thickness of the ribs at the throat area 56 is 0.060 inches and the taper is about 7° for each wall portion. In the second embodiment, the ribs 52 and 54 have thicknesses of 0.040 and 0.060 above and below the step 56 respectively. The diametrical distance of the ribs 54, 54a from tip to tip is 0.366. The ribs 52, 52a and 54, 54a are symmetrically arranged about a vertical axis, i.e., 45° apart from one another.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a nuclear fuel assembly, a unitary one-piece lower tie plate grid comprising:

a lower grid portion and an upper grid portion;

means for supporting fuel rods above the lower tie plate grid including said upper and lower grid portions;

said supporting means comprising a plurality of laterally spaced bosses having portions extending upwardly from said lower grid portion into said upper grid portion and defining apertures within said bosses, said bosses being sized for receiving lower ends of the fuel rods into said apertures, said supporting means further including web portions extending upwardly from said lower grid portion into said upper grid portion and interconnecting said boss portions to define with said boss portions a plurality of flow spaces in said upper grid portion between said web portions and said boss portions extending from said lower grid portion and opening through an upper surface of said lower tie plate grid;

said lower grid portion of said lower tie plate grid including a plurality of openings extending therethrough and opening into said flow spaces for separating debris from a coolant flowing through said lower grid portion into said flow spaces between said boss and said web portions;

said openings being defined in part by central regions in said lower grid portion having laterally projecting ribs in said lower grid portion and connected with said lower grid portion to define at least a pair of said openings opening into said each flow space.

2. A unitary one-piece lower tie plate according to claim 1 wherein said openings are defined in part by ribs projecting laterally from said central regions and terminating in free ends short of said lower web portions in said lower grid portion.

3. A unitary one-piece lower tie plate grid according to claim 2 wherein said openings are generally U-shaped in plan having leg portions extending toward said central regions.

4. A unitary one-piece lower tie plate grid according to claim 1 wherein each said central region has an upper surface defining an uppermost surface of said lower grid portion and a lowermost surface of a flow space in vertical registration therewith, said bosses and said web portions extending from said lower grid portion and terminating in the upper surface of said lower tie plate grid.

5. A unitary one-piece lower tie plate grid according to claim 1 wherein said bosses and said webs have lower boss and web portions in said lower grid portion, the lower boss and web portions and said central regions in said lower grid portion having wall portions defining said openings which taper away from one another in an upward direction to define divergent flow passages opening into said flow spaces, each said opening having a radius along a lower surface of the tie plate grid.

6. A unitary one-piece lower tie plate grid according to claim 1 wherein said bosses and said webs have lower boss and web portions in said lower grid portion, the lower boss and web portions and said central regions in said lower grid portion have step portions in part defining said openings and located intermediate upper and lower surfaces of said lower grid portion with said openings having a larger cross-sectional area immediately above the step portions in the direction of coolant flow than immediately below the step portions, each of said openings having a radius along a lower surface of the tie plate grid.

7. A unitary one-piece lower tie plate grid according to claim 1 wherein said bosses are cylindrical and have vertical centerlines arranged at the corners of square matrices with said webs extending linearly between said bosses along sides of the square matrices, convex portions of said cylindrical bosses extending between perpendicularly oriented webs of each matrix, said bosses and webs having lower boss and web portions in said lower grid portion, said openings in each square matrix being defined in part by a region centrally located within confines of said square matrix and in part by said lower boss and web portions in said lower grid portion, each said opening lying in an area within the square matrix defined by a pair of intersecting diagonal lines passing through the corners of the square matrix.

8. A unitary one-piece lower tie plate grid according to claim 1 wherein the ratio of the overall thickness of the tie plate to the thickness of the lower grid portion thereof is within a range of 4–6:1, the ratio of the flow area through said openings to the area of the lower grid portion lying within a range of about 0.15 to 0.17.

9. A unitary one-piece lower tie plate grid according to claim 1 wherein said bosses and said flow spaces are arranged in a generally square array in said lower tie plate grid, the flow spaces along margins of said lower tie plate grid being enlarged in cross-sectional area in comparison with flow spaces of said grid interiorly of said flow spaces along said grid margins, and at least an additional opening through said lower grid portion in communication with each flow space along the margin of said lower tie plate grid.

10. In a nuclear fuel assembly, a fuel rod support structure comprising:

a lower tie plate assembly including an inlet nozzle, a unitary one-piece lower tie plate grid and a transition structure defining a flow volume for receiving coolant entering said nozzle and flowing coolant to said lower tie plate grid;

said unitary one-piece lower tie plate grid having a lower grid portion and an upper grid portion;

said lower tie plate grid comprising a plurality of laterally spaced bosses having portions extending upwardly from said lower grid portion into said upper grid portion and defining apertures within said bosses, said bosses being sized for receiving lower ends of the fuel rods in said apertures, said lower tie plate grid further including web portions extending upwardly from said lower grid portion into said upper grid portion and interconnecting said boss portions to define with said boss portions a plurality of flow spaces in said upper grid portion between said web portions and said boss portions extending from said lower grid portion and opening through an upper surface of said lower tie plate grid;

said lower grid portion of said lower tie plate grid including a plurality of openings extending therethrough and opening into said flow spaces for receiving the coolant from said flow volume and flowing the coolant through said lower grid portion into said flow spaces between said bosses and said web portions;

said openings being defined in part by central regions in said lower grid portion having laterally projecting ribs in said lower grid portion, said ribs being connected with adjacent portions of said lower grid portion to define at least a pair of said openings opening into each flow space, said openings being defined in further part by ribs projecting laterally from said central regions and terminating in free ends short of adjacent portions of said lower grid portion.

11. A fuel rod support structure according to claim 10 wherein said bosses and said webs have lower boss and web portions in said lower grid portion.

12. A unitary one-piece lower tie plate grid according to claim 10 wherein said bosses and said webs have lower boss and web portions in said lower grid portion, the lower boss and web portions and said central regions in said lower grid portion having wall portions defining said openings which taper away from one another in an upward direction to define divergent flow passages opening into said flow spaces, each said opening having a radius along a lower surface of the tie plate grid.

13. A fuel rod support structure according to claim 10 wherein said bosses and said webs have lower boss and web portions in said lower grid portion, the lower boss and web portions and said central regions in said lower grid portion have step portions in part defining said openings and located intermediate upper and lower surfaces of said lower grid portion with said openings having a larger cross-sectional area immediately above the step portions in the direction of coolant flow than immediately below the step portions, said openings having a radius along a lower surface of the tie plate grid.

14. A unitary one-piece lower tie plate grid according to claim 11 wherein said bosses are cylindrical and have vertical centerlines arranged at the corners of square matrices with said webs extending linearly between said bosses along sides of the square matrices, convex portions of said cylindrical bosses extending between perpendicularly oriented webs of each matrix, said bosses and webs having lower boss and web portions in said lower grid portion, said openings in each square matrix being defined in part by a region centrally located within confines of said square matrix and in part by said lower boss and web portions in said lower grid portion, each said opening lying in an area within the square matrix defined by a pair of intersecting diagonal lines passing through the corners of the square matrix.

15. A unitary one-piece lower tie plate grid according to claim 11 wherein the ratio of the overall thickness of the tie plate to the thickness of the lower grid portion thereof is within a range of 4–6:1, the ratio of the flow area through said openings to the area of the lower grid portion lying within a range of about 0.15 to 0.17.

16. A unitary one-piece lower tie plate grid according to claim 11 wherein said bosses and said flow spaces are arranged in a generally square array in said lower tie plate grid, the flow spaces along margins of said lower tie plate grid being enlarged in cross-sectional area in comparison with flow spaces of said grid interiorly of said flow spaces along said grid margins, and at least an additional opening through said lower grid portion in communication with each flow space along the margin of said lower tie plate grid.

17. A nuclear fuel bundle and support therefor comprising:

upper and lower tie plate assemblies;

a nuclear fuel bundle between said upper and lower tie plate assemblies and including a plurality of fuel rods;

said lower tie plate assembly including means for supporting said nuclear fuel bundles, said lower tie plate assembly further including a lower tie plate grid having a lower grid portion and an upper grid portion;

said lower tie plate grid comprising a plurality of laterally spaced bosses having portions extending upwardly from said lower grid portion into said upper grid portion and defining apertures within said bosses, said bosses being sized for receiving lower ends of said fuel rods in said apertures, said supporting means further including web portions extending upwardly from said lower grid portion into said upper grid portion and interconnecting said boss portions to define with said boss portions a plurality of flow spaces in said upper grid portion between said web portions and said boss portions extending from said lower grid portion and opening through an upper surface of said lower tie plate grid;

said openings being defined in part by central regions in said lower grid portion having laterally projecting ribs in said lower grid portion and connected with said lower grid portion to define at least a pair of said openings opening into each flow space.

18. A nuclear fuel bundle and support therefor according to claim 17 wherein said openings are defined in part by ribs projecting laterally from said central regions and terminating in free ends short of said lower web portions in said lower grid portion.

19. A nuclear fuel bundle and support therefor according to claim 17 wherein said bosses and said webs have lower boss and web portions in said lower grid portion, the lower boss and web portions and said central regions in said lower grid portion having wall portions defining said openings which taper away from one another in an upward direction to define divergent flow passages opening into said flow spaces, said openings having a radius along a lower surface of the tie plate grid.

20. A nuclear fuel bundle and support therefor according to claim 17 wherein each said central region has an upper surface defining an uppermost surface of said lower grid portion and a lowermost surface of a flow space in vertical registration therewith, said bosses and said webs having lower boss and web portions in said lower grid portion, the lower boss and web portions and said central regions in said lower grid portion having step portions in part defining said openings and located intermediate upper and lower surfaces of said lower grid portion with said openings having a larger cross-sectional area immediately above the step portions in the direction of coolant flow than immediately below the step portions, said bosses being cylindrical and having vertical centerlines arranged at the corners of square matrices with said webs extending linearly between said bosses along sides of the square matrices, convex portions of said cylindrical bosses extending between perpendicularly oriented webs of each matrix, said bosses and webs having lower boss and web portions in said lower grid portion, said openings in each square matrix being defined in part by a region centrally located within confines of said square matrix and in part by said lower boss and web portions in said lower grid portion, each said opening lying in an area within the square matrix defined by a pair of intersecting diagonal lines passing through the corners of the square matrix.

* * * * *